United States Patent [19]

Foote et al.

[11] Patent Number: 4,685,241

[45] Date of Patent: Aug. 11, 1987

[54] GRAPHITE FIBER FISHING ROD

[75] Inventors: Danny R. Foote; Wayne O. Turner, both of Spirit Lake, Iowa

[73] Assignee: Berkley and Company, Inc., Spirit Lake, Iowa

[21] Appl. No.: 689,564

[22] Filed: Jan. 7, 1985

[51] Int. Cl.$^4$ ............................................. A01K 87/00
[52] U.S. Cl. ..................................... 43/18.5; 156/166
[58] Field of Search ................. 43/18.1, 18.5; 156/166

[56] References Cited

U.S. PATENT DOCUMENTS

| | | | |
|---|---|---|---|
| 2,742,931 | 4/1956 | Ganahl | 43/18.5 |
| 2,749,643 | 6/1956 | Scott | 43/18 |
| 3,260,010 | 7/1966 | Dubois | 43/18.5 |
| 4,043,074 | 8/1977 | Airhart | 43/18 |
| 4,061,806 | 12/1977 | Lindler et al. | 428/35 |
| 4,133,708 | 1/1979 | Tokuno | 43/18.5 |
| 4,430,851 | 2/1984 | Sundet | 57/211 |

FOREIGN PATENT DOCUMENTS 1351732  5/1974  United Kingdom ................. 43/18.5

Primary Examiner—Gene P. Crosby
Attorney, Agent, or Firm—Faegre & Benson

[57] ABSTRACT

A fishing rod is provided which has a hollow rod body. The rod body is made from laminations of a plurality of plies of fiber-reinforced resin wherein the majority of the fibers are aligned with the axis of the rod and wherein each ply of fiber-reinforced resin contains randomly aligned chopped fibers interconnecting the parallel fibers to distribute the load and maximize the crush and hoop strength of the rod segment.

3 Claims, 5 Drawing Figures

GRAPHITE FIBER FISHING ROD

BACKGROUND OF THE INVENTION

The present invention relates to a fiber-reinforced rod segment and more specifically to fishing rods constructed of graphite fiber-reinforced resins.

For a number of years, rods, such as fishing rods, have been made from multiple plies of fibers which are wrapped about a mandrel to form a hollow rod. The plies normally use an epoxy or other suitable plastic resin to bond the fibers together. The multiple ply rod segment is normally cured on the mandrel and then removed to form the lightweight hollow fishing rod blank.

In order to achieve rods having reduced weight and increased strength, the prior art teaches several different arrangements of the fiber plies in order to achieve high strength. For example, in U.S. Pat. No. 2,749,643, a rod having an outer layer of longitudinally extending glass fiber is shown. That rod has an inner layer of helically wound glass fibers. The two layers are bonded by a flexible plastic resin. In the rod discussed in U.S. Pat. No. 2,749,643, the outer fibers are described as serving as tension and compression members to resist bending of the rod. The inner layer of helically wound fibers is described as resisting crushing to give the rod blank adequate hoop strength. The provision of adequate hoop strength is important to keep the spacing of the outer layers uniform from the neutral axis to obtain maximum bending resistance.

When tapered hollow rods were introduced using graphite filaments in the inner helically wound layer, the hoop and crush strength were provided by wound filaments. The outer plies are formed from a pattern sheet having a right triangular shape having parallel fibers which are aligned with the longitudinal edge of the pattern. When the outer ply is positioned with the short side of the triangle positioned at the large diameter end of the mandrel and the mandrel is rolled across the outer ply, the mandrel moves more rapidly across the outer ply than does the remainder of the mandrel so that the fibers at the large diameter end progressively increase their angle with respect to the axis of the mandrel as they approach the exterior of the rod. After the curing of the wrapped mandrel and consolidation of the plies into an integral laminate, the mandrel is removed and a flexible rod remains. This provides a rod which has a gradually reduced thickness of the outer layer as one moves toward the tip or smaller end of the rod. Although the rod which results is considerably lighter than the fiberglass reinforced rods shown in U.S. Pat. No. 2,749,643, the strength increase is apparently not significantly increased over those rods.

A further attempt to provide an improved rod having optimum bending characteristics and hoop strength is shown in U.S. Pat. No. 4,061,806 which indicates that improved performance can be obtained by utilizing an outer layer of bonded longitudinal glass fibers of less thickness than shown in U.S. Pat. No. 2,749,643 and an inner layer of helically wound graphite filaments impregnated with a resin bonding agent.

SUMMARY OF THE INVENTION

We have discovered that a rod having performance comparable to prior graphite rods can be economically obtained by applying flexible layers of parallel or collimated fibers to a mandrel where the pattern sheet also includes chopped fiber material dispersed in the resin layer used to bond parallel fiber roving into a sheet. The short chopped fibers provide the hoop strength by linking the collimated parallel fibers in the roving, and the rod structure which is produced does not require a separate helical inner layer to provide hoop strength, while the collimated parallel axially aligned fibers in the outer layer provides flex strength.

The process of forming a rod structure from the flexible sheets is substantially simplified over the method of manufacture used in the three prior art patents discussed above. The resultant rod has good crush and hoop strength for the thickness and weight of the rod structure.

DETAILED DESCRIPTION OF THE PREFERRED EMBODIMENT

A fishing rod according to one embodiment of the present invention is formed by preparing a ply of fiber and epoxy, cutting it into a pattern and rolling the mandrel across the pattern to wrap it around the mandrel. The pattern and mandrel are cured and the mandrel is removed to form a rod blank. Unlike the prior art rod construction techniques, only a single fiber-reinforced resin ply or pattern having uniform characteristics across its entire surface is utilized in manufacturing the rod structure. We have discovered that it is not necessary to apply one set of fibers helically on the surface of the mandrel to form the core and then another set aligned longitudinally to form the outer layer, nor is it necessary to form the outer layer using geometrically altered pattern sheets as shown in U.S. Pat. No. 2,749,643 which cause the successive layers of the outer surface to be progressively angled on each layer.

The fiber reinforced pattern which is wrapped on the mandrel to form a rod structure is manufactured in accordance with our new method.

Figure 1:
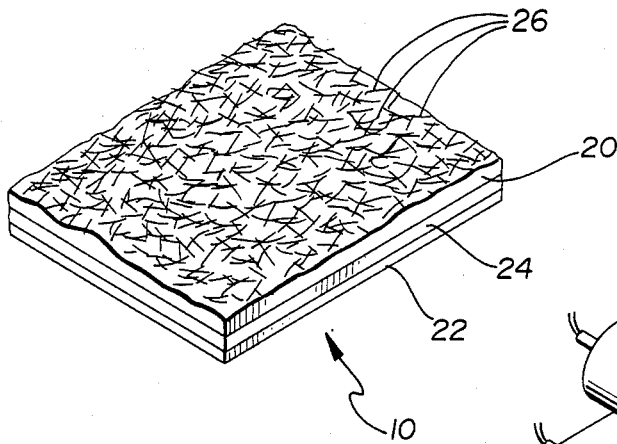
FIG. 1 is a simplified pictorial diagram of the layered materials.

Referring to FIG. 1, the base sheet is formed 10 by applying a modified resin 20 to a sheet of kraft paper 22 treated for subsequent release. In accordance with the preferred embodiment of our method, the kraft paper is typically 5 mils (0.005 inches) thick, and the release characteristics are obtained by coating the surface of the paper with a release agent 20, such as polyvinyl acetate or wax in accordance with well-known procedures.

A typical resin which is suitable for use in the preferred embodiment of the method is an epoxylated novalac or uncured epoxy resin, available from Dow Chemical Corporation. The resin is catalyzed with about four (plus or minus one) percent by weight of dicyandiamide.

The epoxy resin is then modified by adding reinforced fibers 26 such as chopped graphite fibers in an amount of about 7.4% by weight. The chopped graphite fibers are available from manufacturers, such as Stackpole Fibers Co., Inc., of Colwell, Mass. In the preferred embodiment, the graphite fibers 26 have an average length of approximately 0.02 inches. Such fibers have tensile strength above $300 \times 10^3$ p.s.i. and an average modulus of elasticity in excess of $18 \times 10^6$ p.s.i. Other fibers, such as glass, silicon carbide and aramid fibers, could also be used, provided that they are small diameter and chopped into short lengths.

The modified resin or resin and chopped fiber mixture 20 is deposited on the release treated base paper 22 using conventional methods. The width and thickness of the amount of fine resin deposit is adjusted by using a mechanical doctor blade to select a width and thickness which will compensate for heating or solvent loss effects using conventional techniques.

The resin and chopped graphite layer 20 is heated to partially cure the epoxy and catalyst system, thereby increasing its viscosity and reducing its volatile content.

Figure 2:
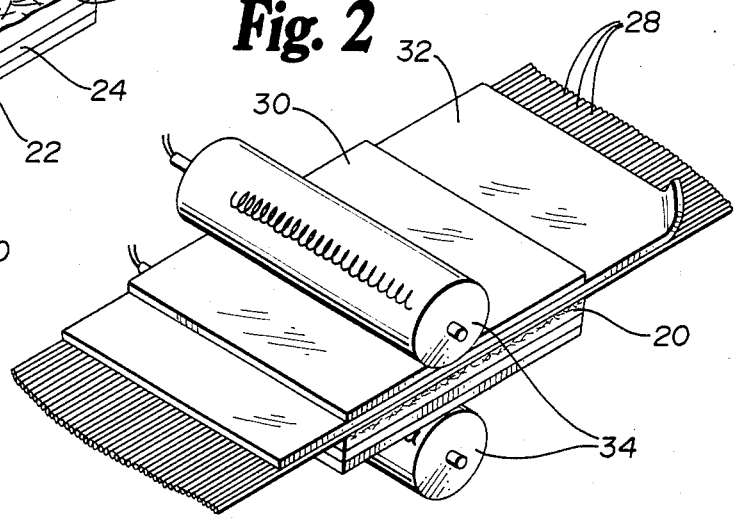
FIG. 2 is a simplified pictorial diagram of additional layers and processing.
Figure 3:
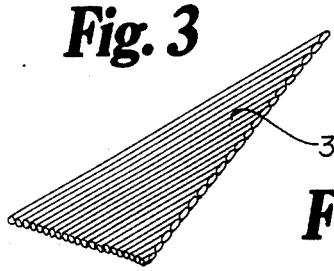
FIG. 3 is a simplified pictorial drawing of a pattern.

Referring to FIG. 2, the coated modified resin layer 20 then receives collimated substantially parallel graphite fibers 28 which are superimposed over the resin layer 20. The collimated fibers 28 are, in the preferred embodiment herein, supplied in roving 32 which is held in tension as it is superimposed over the resin and chopped fiber layer 20.

A secondary release film sheet 30, such as polyethylene film or a suitably treated paper as defined, or the base sheet is then placed in contact with the surface of the graphite roving strands, and the collimated fiber 28 and modified resin coated sheet 20 are subjected to pressure applied by heated rollers 34. The pressure embeds the collimated parallel graphite fibers of the roving into the tacky modified resin layer 20 containing the chopped graphite fibers 26.

Additional heating at the time of the rolling produces a B-stage product which is flexible at room temperatures and allows handling and further processing of the product. The product, at this point, has a volatile content of less than 1% by weight at 325° F. and a total resin content of 40±3 weight percent with a graphite content of 125.5±5.0 grams per square meter where 5.5±0.5 grams are randomly aligned and dispersed chopped graphite.

Typical widths of the material are 12-24 inches. Just before the material is wrapped onto a storage hub, one of the release films is removed. The other release film sheet is removed prior to the triangular-shaped pattern 36 being wrapped onto a mandrel so that only the graphite and resin is used to form the rod structure.

Figure 4:
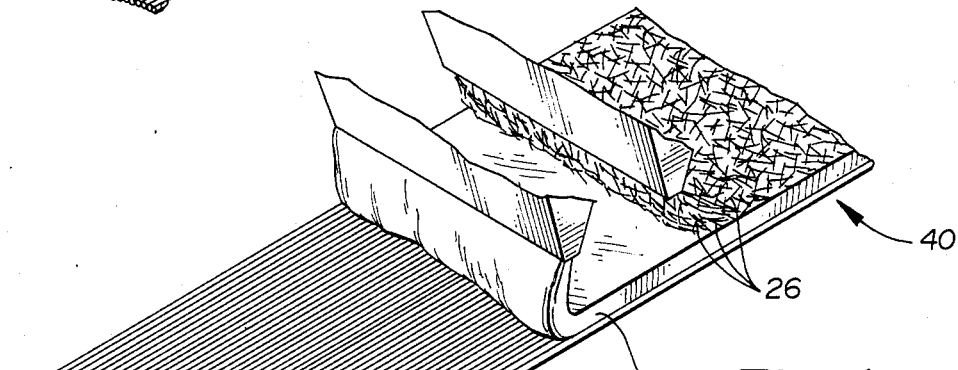
FIG. 4 is a simplified pictorial diagram of an alternate form of this invention.

Referring to FIG. 4, the rod manufacturing process of our invention is not limited to the embodiment disclosed above. It may also be carried out by forming the individual plies by applying the liquid resin 20 and chopped graphite mixture 26 to parallel graphite strands 28 under tension to form a sheet which is cured in an oven to B-stage. The resin 20, when applied, must be thick enough to suspend the chopped fibers 26 in a randomly oriented homogeneous mixture, as it is applied to the collimated parallel fibers.

Figure 5:
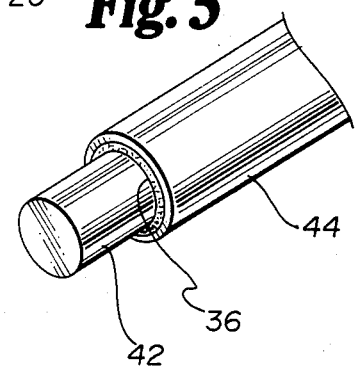
FIG. 5 is a simplified pictorial detail of one end of a mandrel with wrapped material thereon.

Referring to FIG. 5, after the pattern 36 has been wrapped around a mandrel 42, the mandrel 42, and pattern 36 are wrapped with an overlapped layer 44 of Dupont Tedlar and cured in an oven for two hours at 270° F. for a total curing cycle. Using the epoxy material of this preferred embodiment, appropriate curing cycles are 60 minutes at 170°±5° F. and 60 minutes at 280°±5° F. with a transition between curing cycles of 1° to 10° F. per minute.

After the curing is completed, the mandrel 42 is withdrawn from the rod blank, the Tedlar film 44 is removed and the graphite composite fishing rod blank is put through final finishing procedures.

We have tested rod blanks made according to the above method and found them to be of economic advantage with adequate structural properties.

The invention is defined in the claims which follow.

We claim:

1. A fishing rod having a hollow tapered body of generally circular exterior cross-section, the rod having a hollow interior extending along the rod axis, said rod body being constructed of laminations of a plurality of plies of fiber reinforced resin in each of which is a sheet of collimated parallel generally axially aligned reinforcing fibers treated with a mixture of resin and short chopped reinforcing fibers which are uniformly dispersed throughout the resin and randomly oriented, the viscosity of the resin having been selected for supporting the dispersed short chopped reinforcing fibers and the length of the short chopped reinforcing fibers having been selected for forming bonds between adjacent collimated parallel generally axially aligned fibers.

2. The invention of claim 1 wherein the collimated and the short reinforcing fibers are graphite fibers.

3. The invention of claim 2 wherein the short graphite fibers have a nominal length from 0.010 to 0.030 inches and diameters of from 0.0002 to 0.0007 inches and wherein parallel oriented roving strands form the collimated parallel generally axially aligned reinforcing fibers.

* * * * *